(12) United States Patent
Finkenzeller et al.

(10) Patent No.: US 7,908,400 B2
(45) Date of Patent: Mar. 15, 2011

(54) METHOD AND DEVICE FOR SELECTING NETWORK ACCESS TO ONE OR MORE DATA NETWORKS BY MEANS OF A TELECOMMUNICATION TERMINAL

(75) Inventors: Michael Finkenzeller, München (DE); Hans-Peter Huth, München (DE)

(73) Assignee: Siemens Aktiengesellschaft, Munich (DE)

( * ) Notice: Subject to any disclaimer, the term of this patent is extended or adjusted under 35 U.S.C. 154(b) by 975 days.

(21) Appl. No.: 10/532,174

(22) PCT Filed: Oct. 21, 2003

(86) PCT No.: PCT/DE03/03507
§ 371 (c)(1),
(2), (4) Date: Apr. 21, 2005

(87) PCT Pub. No.: WO2004/040850
PCT Pub. Date: May 13, 2004

(65) Prior Publication Data
US 2006/0059261 A1    Mar. 16, 2006

(30) Foreign Application Priority Data
Oct. 25, 2002    (DE) .................................. 102 49 867

(51) Int. Cl.
*G06F 15/16* (2006.01)

(52) U.S. Cl. ....................................................... 709/250
(58) Field of Classification Search ................... 709/250
See application file for complete search history.

(56) References Cited

U.S. PATENT DOCUMENTS

| | | | | |
|---|---|---|---|---|
| 5,826,188 A | * | 10/1998 | Tayloe et al. | 455/428 |
| 6,275,470 B1 | | 8/2001 | Ricciulli | |
| 6,356,541 B1 | * | 3/2002 | Muller et al. | 370/338 |
| 6,965,948 B1 | * | 11/2005 | Eneborg et al. | 709/250 |

FOREIGN PATENT DOCUMENTS

| WO | WO 01/35585 A1 | | 5/2001 |
|---|---|---|---|
| WO | WO 0135585 A | * | 5/2001 |
| WO | WO 01/89142 A2 | | 11/2001 |
| WO | WO 02/41580 A1 | | 5/2002 |
| WO | WO 02/41583 A2 | | 5/2002 |
| WO | WO 03/073700 A2 | | 9/2003 |

* cited by examiner

*Primary Examiner* — Joseph E Avellino
*Assistant Examiner* — Marshall McLeod

(57) ABSTRACT

The invention relates to a method for selecting network access to one or more data networks by means of a telecommunications terminal. In a first step of said method, network access information, which has been determined by the telecommunications terminal and/or additional telecommunications terminals during network connections established by different network access operations, is analysed. In a second step, network access is selected on the basis of the analysed network access information.

20 Claims, 1 Drawing Sheet

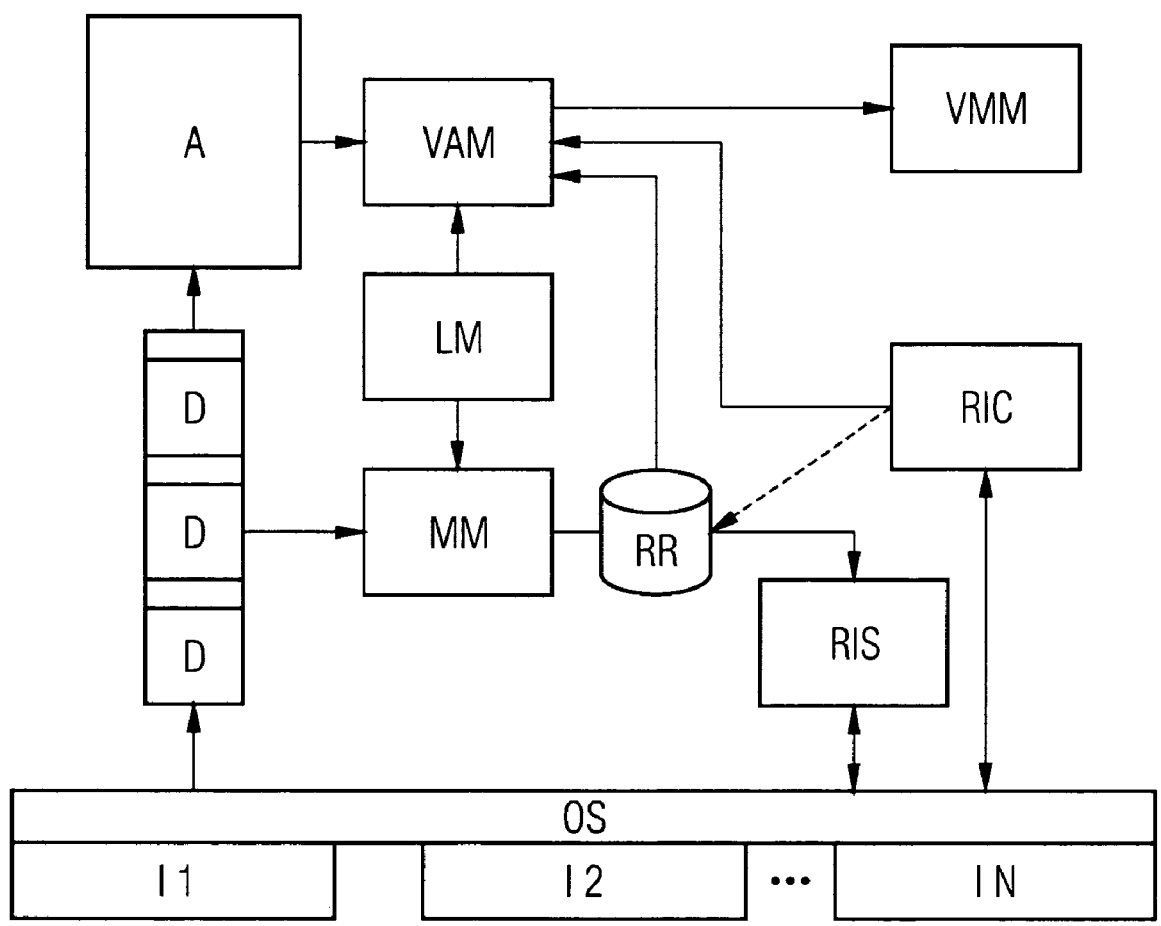

METHOD AND DEVICE FOR SELECTING NETWORK ACCESS TO ONE OR MORE DATA NETWORKS BY MEANS OF A TELECOMMUNICATION TERMINAL

CROSS REFERENCE TO RELATED APPLICATIONS

This application is the US National Stage of International Application No. PCT/DE2003/003507, filed Oct. 21, 2003 and claims the benefit thereof. The International Application claims the benefits of German application No. 10249867.9 filed Oct. 25, 2002, both applications are incorporated by reference herein in their entirety.

FIELD OF THE INVENTION

The invention relates to a method and a device for selecting network access to one or more data networks by means of a telecommunication terminal.

BACKGROUND OF THE INVENTION

New generations of communication terminals, in particular mobile radio terminals, PCs or laptops, generally have several different interfaces by which to gain access to different data networks. For example a notebook can have plug-in cards for GSM, wireless LAN and Bluetooth. These plug-in cards make it possible to access mobile radio communications networks, fixed networks and the Internet or other computers. Meanwhile, a plurality of providers produce both wireless and fixed line connections to the various data networks. These providers are mainly operators of fixed and mobile networks as well as various providers of Internet services who provide access to the Internet. These providers make use of different access technologies and differ both in terms of quality and with regard to price.

Users of data networks would like to select the appropriate network access for their requirements from the plurality of access providers on offer. The main factors in making their choice are price, the provider's services (e.g. e-mails, video streaming etc.) and the quality of the connection. Regarding quality, technically measurable parameters about the access provider, such as the data transfer rate, the data delay or the data loss, are decisive. However, subjective impressions are also significant, for instance the simplicity of the user interface for dialing into the data network. When using the data network to transmit speech or pictures, the audio or video quality also play an important role, as does the reliability of the network access.

Particularly in the case of mobile communication terminals, users are faced with the problem that wherever they happen to be they wish to use the optimum access service for their purposes. Ordinarily, users must make inquiries with different network providers or other end users. However, since users do not always have the time or the opportunity to inquire from other users or network providers, it is often difficult to select the optimum network access. Moreover, network providers very often measure their transmission quality internally, but do not release the data to end users. Furthermore this data is often not gathered according to objective criteria, and is therefore not so meaningful for users.

At the same time there are also centrally managed databases in which profiles of different network providers are stored. However, for the most part these databases do not include statements about the quality of the network access services. End users also have the option to access measurements and tests reported in the press (e.g. by consumer organizations or consumer magazines) as well as rating systems such as network assessments published on the Internet. It takes quite a long time to find out the optimum network access in this way and in many cases the assessments are not up-to-date.

From a document [1] a device and method for selecting network accesses in a telecommunication terminal are known. In said device and method all available network interfaces and network access providers are recorded. On the basis of the recorded data an optimum network access is selected by means of a selection device, in the course of which it is also possible to take account of criteria concerning price and network access quality. In order to select the network access, connections to the individual network providers are first of all set up so as to obtain information about the quality of each network access.

A document [2] discloses a method and a device for dynamically finding a network path in a computer-based network. In this case the data transmission costs of potential network paths are determined in response to a user request and the most cost-effective path is selected from these paths.

SUMMARY OF THE INVENTION

The object of the invention is to improve the first-mentioned method in order to make selecting the network access that is optimum for the user an objective and simple process.

This object is achieved according to the features of the independent claims. Further embodiments of the invention emerge from the dependent claims.

The inventive method for selecting network access to one or more data networks by means of a telecommunication terminal involves a first step in which network access information, which has been determined by the telecommunication terminal and/or additional telecommunication terminals during network connections established by different network access operations, is analyzed. In a second step, network access is then selected on the basis of the analyzed network access information. In contrast to document [1] therefore, it is unnecessary to establish a connection to the various network access providers in order to select a suitable network access, but recourse is available to network access information that has already been recorded. Since the said network access information has been determined by the telecommunication terminal-itself or by additional telecommunication terminals, the information has been determined objectively without having to fall back on the mostly unreliable information from network access providers.

The selection procedure of the method according to the invention preferably includes selecting one or more network access providers, such as a mobile radio communications network operator to enable the telecommunication terminal to connect to an Internet access node, and an Internet service provider to establish the connection from the access node to the Internet. The selection procedure preferably also includes the network interface in the telecommunication terminal, which is needed in order to establish a connection to the providers. The selection then takes into account not only the network access provider, but also the network interfaces available in the telecommunication terminal. This ensures that when a network access provider is selected, the appropriate interface for establishing the connection is also available in the telecommunication terminal.

The network access information includes in particular information concerning the quality of the network accesses and/or the costs incurred for network connections via the said network accesses. The criteria for network access quality are in particular the services available from said network accesses and/or the connection quality of the said network accesses. The connection quality information relates in particular to information about the frequency of cut-outs and interruptions, and/or bandwidths, and/or data losses, and/or data delays, during network connections via the said network accesses.

A preferred embodiment of the inventive method uses adjustable parameters to analyze the network access information. In this embodiment the adjustable parameters are preferably user-specific requirements regarding network access quality, for example the desired data transmission rate or the desired availability of services such as e-mail, the permitted homepage size and the like. However, it is also possible to take into account parameters which are dependent on the user application. For example in the case of a video application the parameters may be set in order to guarantee a high data transmission rate that is free from delay.

The parameters can also include information regarding the location of the telecommunication terminal. This function is particularly important for mobile telecommunication terminals, since the analysis of the network access information can also take into account whether a network access service is available at all in the locality of the telecommunication terminal. The location of the telecommunication terminal is preferably determined automatically, for example via GPS. The location can however also be entered manually by the user. Another option is to inquire from a network access provider, assuming said network access provider has a service for determining the location of the telecommunication terminal.

A further preferred embodiment of the invention analyzes only network access information which has been determined by the telecommunication terminal and/or additional telecommunication terminals in a predefined area surrounding the location of the telecommunication terminal. Said embodiment preselects the network access information, ignoring less relevant information from telecommunication terminals in distant locations. In this way the relevant network access information can be analyzed more quickly.

In a further embodiment, the network access information determined in the telecommunication terminals is also made available to the network access providers so that said providers have the opportunity to improve their services on the basis of the information provided. The information can also be made available to network service providers who only provide services in the network without providing access to the network itself, such as e-mail service providers.

In a preferred embodiment of the invention, the network access information is updated at regular intervals to keep all of the recorded network access information up-to-date at all times. In a further embodiment, the network access information can also be accompanied by user-specific comments.

In a further embodiment of the invention, the network access information is stored on a central computer. The information can however also be stored on a decentralized basis in the telecommunication terminal or the additional telecommunication terminals.

Furthermore in an especially preferred embodiment, the demands upon the telecommunication terminal location that is needed for the selected network access are determined with the aid of the selected network access. This is particularly advantageous in the case of mobile telecommunication terminals, since in appropriate cases a user finds out by this means that it is necessary to go to a different location in order to dial into the optimum network access. In an especially preferred embodiment, a navigation system informs the user how to get from the present location to the location needed for the selected network access.

In a preferred embodiment of the invention, the telecommunication terminal is connected to the additional telecommunication terminals in order to exchange data. This connection for exchanging data is preferably direct, i.e. the data connection takes place without intermediate circuits via further devices, in particular via wireless LAN and/or via an ad hoc network and/or via Bluetooth interfaces and/or infrared interfaces. In this case the selected network access can be a network access which takes place via one of the additional telecommunication terminals and in which data from the selected network access can be transmitted to the telecommunication terminal via the data exchange connection. The telecommunication terminals are preferably mobile radio terminals and/or computers.

In a further preferred embodiment of the invention, the network access information that is determined is preferably based on passive measurements in the telecommunication terminal and/or the additional telecommunication terminals. The term passive measurement means in this case a measurement carried out exclusively on the telecommunication terminal and/or the additional telecommunication terminals, i.e. no other computers, and especially no servers of the network access provider, are involved in the measurement. Consequently there is no requirement for measurement software to be brought into the data network.

In addition to the method described above, the invention also relates to a device for selecting network access to one or more data networks by means of a telecommunication terminal, this device being capable of executing the inventive method described above. For this purpose the device preferably possesses means for analyzing network access information which has been determined by the telecommunication terminal and/or additional telecommunication terminals during network connections via different network accesses, as well as means for selecting a network access on the basis of the analyzed network access information. Preferably in this case the device is integrated in a telecommunication terminal.

Typical embodiments of the invention will now be presented and explained in greater detail with the aid of the drawing.

BRIEF DESCRIPTION OF THE DRAWING

The FIGURE shows a diagram of a device for executing an embodiment of the method to which the invention relates.

DETAILED DESCRIPTION OF THE INVENTION

The FIGURE shows an inventive device for selecting network access to data networks by means of a telecommunication terminal such as a mobile telephone. The components of the device are shown in the FIGURE and are preferably all integrated in a single telecommunication terminal. However it is also possible for individual components to be implemented in a central computer or in additional telecommunication terminals.

The components I1 to IN shown in the diagram represent network interfaces of the telecommunication terminal. The interfaces are managed by an operating system OS. This operating system also manages all the components of the inventive device, which are described below. Data D from a data network travels via the interfaces I1 to IN to an application A which is implemented in the telecommunication terminal and which processes this data. The data is also forwarded to a monitor module MM in which the quality of the current network connection between the telecommunication terminal and the corresponding access server or an additional telecommunication terminal is recorded and processed for storage in a further module RR. The processing is carried out in order to link the recorded data with data from a localizing module LM.

The localizing module determines the present geographic location of the telecommunication terminal. The location is determined either automatically, for instance with the aid of the GPS global positioning system, or from the location information which the user of the terminal enters manually. The location can also be determined by means of an inquiry to the provider of the current data network connection.

The linked data in the module MM is stored in a reputation repository module RR. This module therefore holds the quality recorded for the current network connection. Said module also holds information regarding the quality of earlier network connections to the same or different network access providers.

The module RR is thus a database, which the telecommunication terminal has created, containing information on the quality of earlier network accesses. It is therefore no longer necessary to rely on information from a network access provider, which in most cases is neither impartial nor reliable.

The module RR is connected to a connection analysis module VAM, which in turn contains application-specific information from the application A. The said module VAM analyzes the information from the module RR with the aid of parameters which may be dependent on the application A and/or may be user-defined. The parameters which the module VAM uses may include for instance the data quality or data transmission rate desired by, the user.

However, the module VAM accesses other data besides that held in the module RR. Information about the quality of network accesses via other telecommunication terminals can also be included in the analysis. For this purpose the module VAM is connected to the reputation information client module RIC, which directs inquiries to additional telecommunication terminals regarding the network access information that the said devices have recorded.

The module RIC is also coupled to the module RR, as shown by the broken line in the FIGURE. Since the module RR also contains information about the location of the telecommunication terminal, the link between the modules RIC and RR also enables a selection to be made between the telecommunication terminals to be questioned by the RIC with regard to their locations. In particular it is possible to question only telecommunication terminals which are located in a defined area around the telecommunication terminal making the inquiry. This is particularly advantageous for mobile radio communications networks, since in this case only information about the connection quality in the surrounding area is of interest to the user.

A further module, the reputation information service module RIS, enables other telecommunication terminals also to access the data stored in the module RR. The module RIS is likewise in contact with the module RR and handles inquiries via the network interfaces I1 to IN from other telecommunication terminals about the information held in the RR.

The analysis module VAM is also in contact with a connection management module VMM. This module uses the data analyzed in the module VAM to decide which network access to select for the connection to the data network. During this process all potential combinations of the possible physical interfaces I1 to IN and the available network access providers are determined; this information is then used to determine the network access which is optimum for the user with particular regard to the connection quality and the connection charge. The module VMM can also provide information about measures which may be required in order to guarantee the optimum network access. In particular the user of a mobile radio communication terminal can be advised to proceed to a different location, since it is not possible to connect to the optimum network access from the present location. Another measure could be to change the physical interface.

The device described above makes it possible to analyze the network access data from a plurality of telecommunication terminals and on the basis of said data to determine an optimum network access, the selection of said network access being independent of information from the network access providers.

Bibliography:
[1] WO 02/41580 A1
[2] U.S. Pat. No. 6,275,470 B1

The invention claimed is:

1. A method for selecting network access to at least one data network using a telecommunication terminal device comprising:

the telecommunication terminal device selecting access to a first network;

the telecommunication terminal device connecting to the first network;

the telecommunication terminal device determining a location of the telecommunication terminal device with the aid of the first network;

the telecommunication terminal device recording and saving quality of service information for the first network while connected to the first network;

the telecommunication terminal device saving location data comprised of information relating to the determined location;

the telecommunication terminal device linking the saved location data to the recorded and saved quality of service information for the first network;

the telecommunication terminal device disconnecting from the first network;

the telecommunication terminal device determining that a plurality of networks are available, the available networks comprising the first network and at least one second network;

the telecommunication terminal device analyzing the saved quality of service information and saved location data for the first network to select access to one of the first network and a second network of the at least one second network;

the telecommunication terminal device selecting access to one of the first network and the second network of the at least one second network; and the telecommunication terminal device connecting to the selected first network or the second network of the at least one second network; and wherein the telecommunication terminal device determines the location of the telecommunication terminal device and performs the linking of the saved location data while the telecommunication terminal device is connected to the first network; and wherein the analyzing of the saved quality of service information for the first network to select access to the first network or the second network of the at least one second network considers the location information linked to the recorded and saved quality of service information for the first network.

2. The method of claim 1 wherein the telecommunication terminal device is one of a mobile radio terminal, a computer, and a laptop and the analyzing of the saved quality of service information for the first network to select access to the first network or the second network of the at least one second network is based on an analysis method that depends upon at least one user defined parameter.

3. A method for selecting network access to at least one data network using a telecommunication terminal device comprising:
the telecommunication terminal device selecting access to a first network;
the telecommunication terminal device connecting to the first network;
the telecommunication terminal device recording and saving quality of service information for the first network;
the telecommunication terminal device saving location data comprised of location information relating to a determined location of the telecommunication terminal device while connected to the first network, wherein the telecommunication terminal device determines the determined location of the telecommunication terminal device and links the saved location data while the telecommunication terminal device is connected to the first network;
the telecommunication terminal device disconnecting from the first network;
a plurality of networks being available, the networks comprising the first network and at least one second network;
the telecommunication terminal device analyzing the saved quality of service information for the first network to select access to one of the first network and a second network of the at least one second network, wherein the analyzing of the saved quality of service information for the first network to select access to the first network or the second network of the at least one second network considers the location information linked to the recorded and saved quality of service information for the first network;
the telecommunication terminal device communicating with at least one other telecommunication terminal device to obtain quality of service information for the at least one second network for use in determining which network to select;
the telecommunication terminal device selecting access to one of the first network and the second network of the at least one second network; and
the telecommunication terminal device connecting to the selected second network or the selected first network.

4. The method of claim 3 wherein the telecommunication terminal device is one of a mobile radio terminal, a computer, and a laptop and the at least one other telecommunication terminal device is within a predetermined distance of the telecommunication terminal device.

5. The method of claim 1 wherein the telecommunication terminal device is configured to communicate the saved quality of service information for the first network to other telecommunication terminal devices.

6. The method of claim 1 wherein the analyzing of the saved quality of service information for the first network accounts for at least one interface of the telecommunication terminal device.

7. The method of claim 6 wherein the second network of the at least one second network is selected after the analyzing of the saved quality of service information and saved location data.

8. The method of claim 1 wherein the telecommunication terminal device is a mobile radio telecommunication terminal.

9. The method of claim 1 further comprising the telecommunication terminal device analyzing costs or charges associated with access to each second network for use in determining which of the first network and the second network of the at least one second network to select.

10. The method of claim 1 wherein the analyzing of the saved quality of service information for the first network to select access to the first network or the second network of the at least one second network is based on an analysis method that depends upon at least one network access quality parameter and at least one account parameter.

11. The method of claim 10 wherein the at least one account parameter is comprised of at least one parameter dependent upon a selected video application.

12. The method of claim 1 further comprising storing the quality of service information for the first network on a central computer.

13. The method of claim 1 further comprising updating the stored quality of service information for the first network.

14. The method of claim 1 wherein the selecting of access to the first network or the second network of the at least one second network is determined based upon telecommunication terminal device location requirements needed for access to the second network of the at least one second network.

15. The method of claim 14 further comprising a navigation system of the telecommunication terminal device communicating directions on how to get to a location needed for access to the second network of the at least one second network.

16. A telecommunication terminal device comprising:
at least one interface for connecting to at least one network;
a monitor module connected to the at least one interface, the monitor module configured to monitor a quality of a network connection between the telecommunication terminal device and a network when the telecommunication terminal device is connected to the network;
a reputation repository module connected to the monitor module, the reputation repository module configured to retain quality of network connection information monitored by the monitor module;
a connection analysis module connected to the reputation repository module, the connection analysis module configured to analyze network connection information retained in the reputation repository module; and
a connection management module connected to the connection analysis module, the connection management module configured to use data analyzed in the connection analysis module to determine an accessible network to select for connection to a network; and
the telecommunication terminal device configured to determine a location of the telecommunication terminal device when connected to the network and link that location with saved quality of network connection information such that the connection analysis module can access and evaluate the location information when analyzing network connection information;
wherein the telecommunication terminal device determines the location and performs linking of the saved location information while the telecommunication terminal device is connected to the network; and
wherein the telecommunication terminal analyzes the retained quality of network connection information for the network to select access to the network or another network and considers the location information linked to the retained quality of network connection information for the network to select the accessible network to which to connect.

17. The telecommunication terminal device of claim 16 wherein the connection management module is configured to process all potential combinations of the interfaces and available network access providers to use to determine an optimum network access to select for connection to that network.

18. The telecommunication terminal device of claim 16 further comprising:
 a reputation information client module connected to the connection analysis module, the reputation information client module configured to direct communications with other telecommunication terminal devices to obtain network access information that the other telecommunication terminal devices have stored; and
 the connection analysis module configured to access the network access information that the other telecommunication terminal devices have stored that were obtained by the reputation information client module.

19. The telecommunication terminal device of claim 18 wherein the reputation information client module is connected to the reputation repository module and wherein the telecommunication terminal device and the other telecommunication terminal devices are devices selected from the group consisting of mobile telephones, mobile radio terminals, and laptops.

20. The telecommunication terminal device of claim 19 further comprising a localizing module connected to the reputation repository module, the localizing module configured to determine the location of the telecommunication terminal device with the aid of the network, the data of the determined location also being stored in the reputation repository module.

* * * * *